(12) United States Patent
Allan et al.

(10) Patent No.: US 8,057,666 B2
(45) Date of Patent: Nov. 15, 2011

(54) BIOMASS AND WASTE PLASTICS TO NEODIESEL AND VALUABLE CHEMICALS VIA SUPERCRITICAL WATER

(75) Inventors: Graham Allan, Kenmore, WA (US); Thomas E. Loop, Seattle, WA (US); James D. Flynn, Auburn, WA (US)

(73) Assignee: Xtrudx Technologies, Inc., Seattle, WA (US)

( * ) Notice: Subject to any disclaimer, the term of this patent is extended or adjusted under 35 U.S.C. 154(b) by 0 days.

(21) Appl. No.: 12/828,102

(22) Filed: Jun. 30, 2010

(65) Prior Publication Data

US 2010/0329938 A1 Dec. 30, 2010

Related U.S. Application Data

(63) Continuation-in-part of application No. 12/402,489, filed on Mar. 11, 2009.

(60) Provisional application No. 61/035,380, filed on Mar. 11, 2008, provisional application No. 61/110,505, filed on Oct. 31, 2008.

(51) Int. Cl.
*B01D 17/00* (2006.01)
*B01J 10/00* (2006.01)

(52) U.S. Cl. ........ 210/177; 210/175; 210/511; 422/199; 422/608; 422/618; 219/618; 219/628; 585/802; 585/833; 264/12

(58) Field of Classification Search .............. 210/175, 210/177, 180–182, 259, 511, 521, 522; 422/138, 422/198, 199, 208, 602, 608, 618, 242; 219/600, 219/618, 628, 630, 635; 44/605; 585/240, 585/241, 800, 802, 833–838; 264/12, 13
See application file for complete search history.

(56) References Cited

U.S. PATENT DOCUMENTS 4,237,226 A 12/1980 Grethlein
(Continued)

FOREIGN PATENT DOCUMENTS

| CN | 200610011584 | 10/2007 |
|---|---|---|
| CN | 200610011585 | 10/2007 |
| WO | PCT/EP2007/054378 | 11/2007 |

OTHER PUBLICATIONS

Masaru Watanabe, Hiroshi Inomata, Mitsumasa Osada, Takafumi Sato, Tadafumi Adschiri and Kunio Arai, "Catalytic effects of NaOH and ZrO2 for partial oxidative gasification of n-hexadecane and lignin in supercritical water" Fuel, vol. 82, Issue 5, Mar. 1, 2003, pp. 545-552.

(Continued)

*Primary Examiner* — Joseph Drodge

(74) *Attorney, Agent, or Firm* — Thomas E. Loop; Graybeal Jackson LLP

(57) ABSTRACT

A supercritical fluid polymer depolymerization machine is disclosed herein, which machine is capable of converting a wide range of biomass and/or waste plastic materials into a plurality of reaction products (liquid and gaseous) including fermentable sugars, hydrocarbons, and various aromatic substances that, in turn, are readily convertible into liquid transportation fuel known as "neodiesel." In one embodiment, a supercritical fluid reaction apparatus for transforming a selected polymeric material flowstream into a plurality of reaction products is disclosed and comprises, in fluidic series: an extruder; a supercritical fluid reaction zone fluidicly connected to the extruder, the supercritical fluid reaction zone being proximate to a circumferentially positioned heater, with the heater being configured to transfer heat to the selected polymeric material flowstream admixed together with water to supercritical conditions to thereby facilitate chemical reaction; and a reaction products separation chamber fluidicly connected to the supercritical fluid reaction zone.

7 Claims, 10 Drawing Sheets

U.S. PATENT DOCUMENTS

| | | | |
|---|---|---|---|
| 4,642,287 A | 2/1987 | Inoi et al. | |
| 4,744,926 A | 5/1988 | Rice | |
| 4,747,948 A * | 5/1988 | North | 210/633 |
| 4,849,554 A * | 7/1989 | Cresswell et al. | 570/159 |
| 5,216,149 A * | 6/1993 | Evans et al. | 540/538 |
| 5,278,282 A * | 1/1994 | Nauman et al. | 528/497 |
| 5,324,904 A * | 6/1994 | Cresswell et al. | 219/635 |
| 5,386,055 A * | 1/1995 | Lee et al. | 562/512.2 |
| 5,393,863 A * | 2/1995 | Yau et al. | 528/308.4 |
| 5,405,533 A | 4/1995 | Hazlebeck et al. | |
| 5,411,594 A | 5/1995 | Breisford | |
| 5,558,783 A | 9/1996 | McGuinness | |
| 5,670,614 A | 9/1997 | Roby et al. | |
| 5,707,673 A | 1/1998 | Prevost et al. | |
| 6,083,409 A | 7/2000 | Lin et al. | |
| 6,090,595 A | 7/2000 | Foody et al. | |
| 6,107,532 A * | 8/2000 | Saito et al. | 585/241 |
| 6,180,845 B1 | 1/2001 | Catallo et al. | |
| 6,409,841 B1 | 6/2002 | Lombard | |
| 6,504,068 B1 * | 1/2003 | Matsubara et al. | 585/240 |
| 6,569,640 B1 | 5/2003 | Castor et al. | |
| 6,602,064 B1 | 8/2003 | Chen et al. | |
| 6,884,377 B1 | 4/2005 | Burnham et al. | |
| 6,966,874 B2 | 11/2005 | Cornay et al. | |
| 7,070,743 B2 * | 7/2006 | Blackwell et al. | 422/186.01 |
| 7,189,306 B2 | 3/2007 | Gervais | |
| 7,318,713 B2 | 1/2008 | Xu et al. | |
| 7,722,690 B2 * | 5/2010 | Shires et al. | 48/197 R |
| 2002/0148575 A1 | 10/2002 | Wingerson | |
| 2004/0094144 A1 | 5/2004 | Ikegami et al. | |
| 2005/0009935 A1 | 1/2005 | Mukaide et al. | |
| 2005/0242464 A1 | 11/2005 | Goto et al. | |
| 2006/0141584 A1 | 6/2006 | Litzen et al. | |
| 2006/0283995 A1 | 12/2006 | Wingerson | |
| 2007/0110837 A1 * | 5/2007 | Goto et al. | 425/203 |
| 2007/0161095 A1 * | 7/2007 | Gurin | 435/134 |
| 2008/0020437 A1 | 1/2008 | Savarese | |
| 2008/0196299 A1 | 8/2008 | Anitescu et al. | |
| 2008/0229653 A1 | 9/2008 | Iversen et al. | |

OTHER PUBLICATIONS

Shiro Saka, Katsunobu Ehara, Seiya Sakaguchi, and Kei Yoshida, "Useful Products from Lignocellulosics by Supercritical Water Technologies", delivered at the 2nd Joint International Conference on "Substainable Energy and Environment (SEE 2006)" Nov. 1-23, 2006, Bangkok, Thailand, 5 pages.

Mitsumasa Osada, Takafumi Sato, Masaru Watanabe, Masayuki Shirai, and Kunioi Arai, "Catalytic Gasification of Wood Biomass in Subcritical and Supercritical Water", Combustion Science and Technology in vol. 178, Nos. 1-3, No. 1-3/Jan. 2006 pp. 537-552.

Yikihiko Matsumura, Mitsuru Sasaki, Kazuhide Okuda, Seiichi Takami, Satoshi Ohara, Mitsuoumetsu, and Tadafumi Adschiri, "Supercritical Water Treatment of Biomass for Energy and Material Recovery", Combustion Science and Technology in vol. 178, Nos. 1-3/Jan. 2006 pp. 509-536.

Z. Fang, T. Minowa, R.L. Smith, Jr., T. Ogi and J.A. Kozinski, "Liquefaction and Gasification of Cellulose with Na2CO3 and Ni in Subcritical Water at 350° C.", Ind. Eng. Chem. Res., 2004, 43(1), pp. 2454-2463, Publication Date (Web): Apr. 16, 2004 (Article).

Ali Sinag, Andrea Kruse, and Jens Rathert, "Influence of the Heating Rate and the Type of Catalyst on the Formation of Key Intermediates and on the Generation" of Gases During Hydrophyrolysis of Glucose in Supercritical Water in a Batch Reactor Ind. Eng. Chem. Res., 2004, 43(2), pp. 502-508, Publication Date (Web): Dec. 23, 2003 (Article).

A. Kruse, T. Henningsen, A. Sinag, and J. Pfeiffer, "Biomass Gasification in Supercritical Water: influence of the Dry Matter Content and the Formation of Phenois" Ind. Eng. Chem. Res., 2003, 42(16), pp. 3711-3717, Publication Date (Web): Jul. 11, 2003 (Article), DOI: 10.1021/ie0209430.

Takuya Yoshida, Yoshito Oshima, and Yukihiko Matsumura, "Gasification of biomass model compounds and real biomass in supercritical water" Biomass and Bioenergy, vol. 26, Issue 1, Jan. 2004, pp. 71-78.

A. Kruse and A. Gawlik, "Biomass Conversion in Water at 330-410° C. and 30-50 MPa. Identification of Key Compounds for Indicating Different Chemical Reaction Pathways", Ind. Eng. Chem. Res., 2003, 42(2), pp. 267-279, Publication Date (Web): Dec. 18, 2002 (Article).

B. Potic, L. Van De Beld, D. Assink, W. Prins and W.P.M. Van Swaaij, "Gasification of Biomass in Supercritical Water" paper, University of Twente, Faculty of Chemical Technology circa 2006.

Katsunobu Ehara, Shiro Saka, and Haruo Kawamoto, "Characterization of the Lignin-derived Products from Wood as Treated in Supercritical Water" J. Wood Sci (2002) vol. 48, No. 1, pp. 320-325.

Mitsuru Sasaki, Momoko Furukawa, Kimitaka Minami, Tadafumi Adschiri, and Kunio Arai, "Kinetics and Mechanism of Cellobiose Hydrolysis and Retro-Aldol Condensation in Subcritical and Supercritical Water" Ind. Eng. Chem. Res., 2002, 41(26), pp. 6642-6649, Publication Date (Web): Nov. 19, 2002 (Article).

Takuya Yoshida and Yukihiko Matsumura, "Gasification of Cellulose, Xyland, and Lignin Mixtures in Supercritical Water" Ind. Eng. Chem. Res., 2001, 40(23), pp. 5469-5474, Publication Date (Web): Oct. 18, 2001 (Article) DOI: 10.1021/ie0101590.

K. Ehara, S. Saka and H. Kawamoto, "Chemical Conversion of Woody Biomass by Supercritical Water—Degradation of Lignin" 12th European Conference on Biomass for energy, Industry and Climate Protection, Jun. 17-21, 2002, Amsterdam, The Netherlands, (2002) pp. 805-808.

Andrea Kruse, Danny Meier, Pia Rimbrecht, and Michael Schacht, "Gasification of Pyrocatechol in Supercritical Water in the Presence of Potassium Hydroxide" Ind. Eng. Chem. Res., 2000, 39 (12), pp. 4842-4848, Publication Date (Web): Nov. 16, 2000 (Article) DOI: 10.1021/ie0001570.

Michael Jerry Antal, Jr., Stephen Glen Allen, Deborah Schuman, and Xiaodong Su, Robert H, Divilio, "Biomass Gasification in Supercritical Water" Ind. Eng. Chem. Res., 2000, 39(11), pp. 4040-4053, Publication Date (Web): Oct. 14, 2000 (Article).

Hiroki Ando, Tsuyoshi Sakaka, Tesuro Kokusho, Masao Shibata, Yoshimitsu Uemura, and Yasuo Hatate, "Decomposition Behavior of Plant Biomass in Hot-Compressed Water", Ind. Eng. Chem. Res., 2000, 39(10), pp. 3688-3693, Publication Date(Web): Aug. 23, 2000 (Article).

Mitsuru Sasaki, Zhen Fang, Yoshiko Fukushima, Tadafumi Adschiri, and Kunio Arai, "Dissolution and Hydrolysis of Cellulose in Subcritical and Supercritical Water" Ind. Eng. Chem. Res., 2000, 39(8), pp. 2883-2890 Publication Date (Web): Aug. 7, 2000 (Article) DOI: 10.1021/ie990690j.

Philip E. Savage, "Organic Chemical Reactions in Supercritical Water", University of Michigan, Chemical Engineering Department, Ann Arbor, Michigan 48109-2136, Chem. Rev., 1999, 99(2), pp. 603-622, DOI: 10.1021/cr9700989, Publication Date (Web): Jan. 5, 1999.

Shiro Saka and Tomonori Ueno, "Chemical conversion of various celluloses to glucose and its derivatives in supercritical water" Cellulose, vol. 6, No. 3, Sep. 1999, pp. 177-191(15) Publisher: Springer.

B.M. Kabyemela, M. Takigawa, T. Adschiri, R.M. Malaluan, and K. Arai, "Mechanism and Kinetics of Cellobiose Decomposition in Sub- and Supercritical Water" Ind. Eng. Chem. Res., 1998, 37(2), pp. 357-361, Publication Date (Web): Jan. 9, 1998 (Article), DOI: 10.1021/ie9704408.

Misuru Sasaki, Bernard Kabyemela, Roberto Malaluan, Satoshi Hirose, Naoko Takeda, Tadafumi Adschiri, and Kuinio Arai, "Cellulose Hydrolysis in subcritical and supercritical water" The Journal of Supercritical Fluids vol. 13 Issues 1-3, pp. 261-268 (1998).

Bernard M. Kabyemela, Tadafumi Adschiri, Roberto Malaluan, and Kunio Arai Degradation Kinetics of Dihydroxyacetone and Glyceraldehyde in Subcritical and Supercritical Water: Ind. Eng. Chem. Res., 1997, 36(6), pp. 2025-2030 Publication Date (Web): Jun. 2, 1997 (Article) DOI: 10.1021/ie960747r.

Bernard M. Kabyemela, Tadafumi Adschiri, Roberto M. Malaluan, Kunio Arai, and Hiroshi Ohzeki, "Rapid and Selective Conversion of Glucose to Erythrose in Supercritical Water", Ind. Eng. Chem. Res., 1997, 36(12), pp. 5063-5067 Publication Date (Web): Dec. 1, 1997 (Article).

Bernard M. Kabyemela, Tadafumi Adschiri, Roberto M. Malaluan, Kunio Arai, "Kinetcis of Glucose Epimerization and Decomposition in Subcritical and Supercritical Water" Ind. Eng. Chem. Res., 1997 36(5), pp. 1552-1558 Publication Date (Web): May 5, 1997 (Article) DOI: 10.1021/ie960250h.

Xiaodong Xu, Yukihiko Matsumura, Jonny Stenberg, and Michael Jerry Antal, Jr., "Carbon-Catalyzed Gasification of Organic Feedstocks in Supercritical Water" Ind. Eng. Chem. Res., 1996, 35(8), pp. 2522-2530 Publication Date (Web): Aug. 8, 1996 (Article) DOI: 10.1021/ie950672b.

Phillip E. Savage, Sudhama Goplalan, Tahmid I. Mizan, Christopher J. Martino, and Eric E. Brock, "Reactions at Supercritical Conditions: Applications and Fundamentals" AIChE Journal Jul. 1995 vol. 41, No. 7 p. 1723-1778.

Douglas C. Elliot, M.R. Phelps, L. John Sealock Jr., and Eddie G. Baker, "Chemical Processing in High-Pressure Aqueous Environments. 4. Continuous-Flow Reactor Process Development Experiments for Organics Destruction" Ind. Eng. Chem. Res., 1994, 33(3), pp. 566-574 Publication Date: Mar. 1994.

Douglas C. Elliot, L. John Sealock Jr., and Eddid G. Baker, "Chemical processing in high-pressure aqueous environments. 2. Development of catalysts for gasification" Ind. Eng. Chem. Res., 1993 32(8), pp. 1542-1548 Publication Date: Aug. 1993 (Article) DOI: 10.1021/ie00020a002.

K. Ehara and S. Saka, Chemical Conversion of Cellulose by Batch-Type and Flow-Type Supercritical Water Systems: 12th European Conference on Biomass for energy, Industry and Climate Protection, Jun. 17-21, 2002, Amsterdam, The Netherlands, (2002) pp. 801-804.

Mitch Jacoby, "Chemicals from the Garden", Chemical & Engineering News, Jul. 6, 2009 vol. 87, No. 27, p. 10 p. 26-28.

Tao Xiang and Kieth P. Johnston, "Acid-Base of Behavior of Organic Compounds in Supercritical Water" The Journal of Physical Chemistry, Publication Date (Web) May 1, 2002.

Gerald E. Bennett and Keith P. Johnston, "UV-visible absorbance spectroscopy of organic probes in supercritical water", The Journal of Physical Chemistry, Publication Date (Web) May 1, 2002.

Christine J. Wu, Laurence E. Fried, Lin H. Yang, Nir Goldman and Sorin Bastea "Catalytic behavior or dense hot water", Nature Chemistry vol. 1, Apr. 2009 published online: Mar. 19, 2009.

M. Goto, M. Sasaki, T. Hirose, "Reactions of polymers in supercritical fluids for chemical recycling of waste plastics", Journals of Materials Science vol. 41 No. 5, Mar. 2006, p. 1509-1515.

* cited by examiner

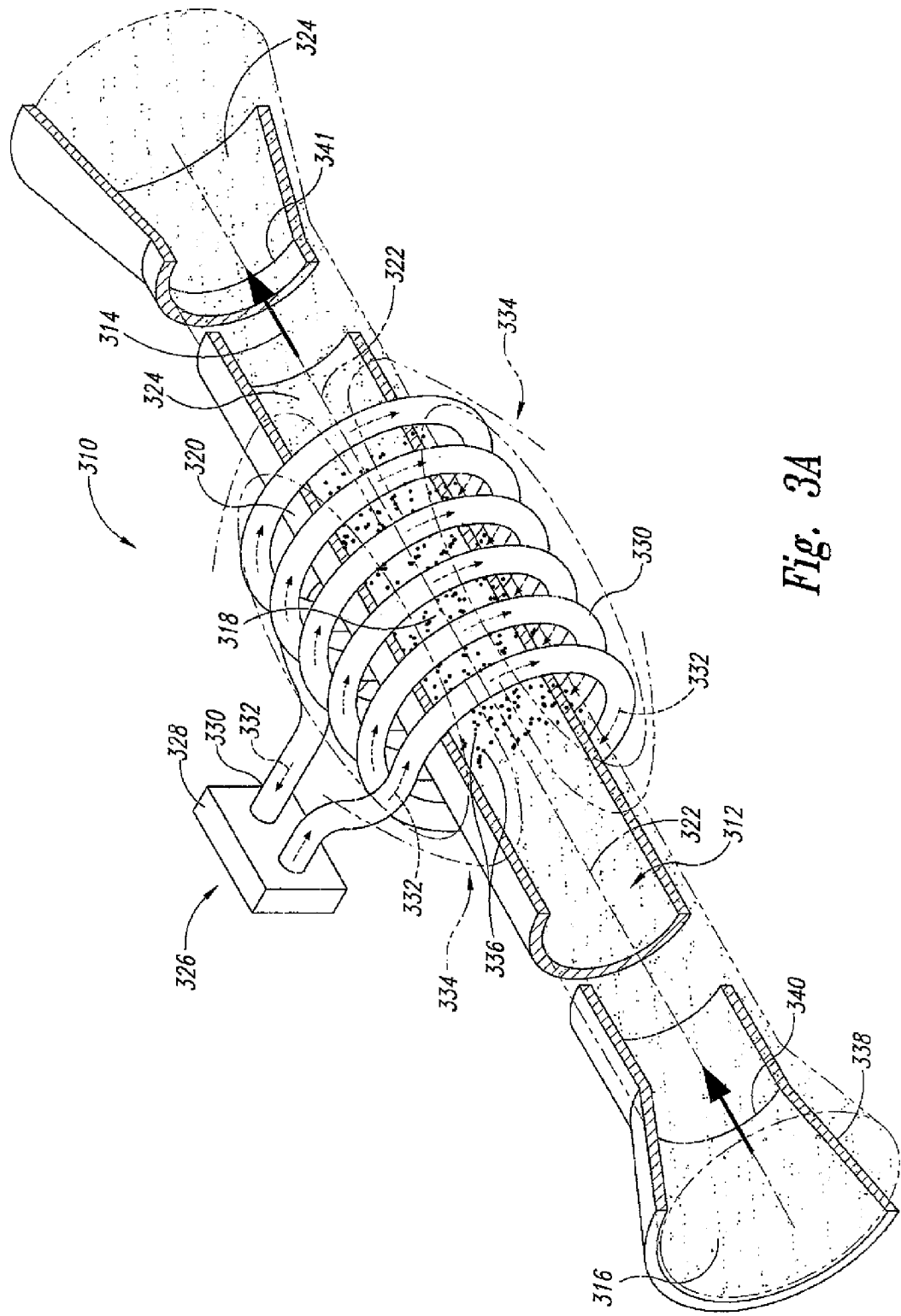

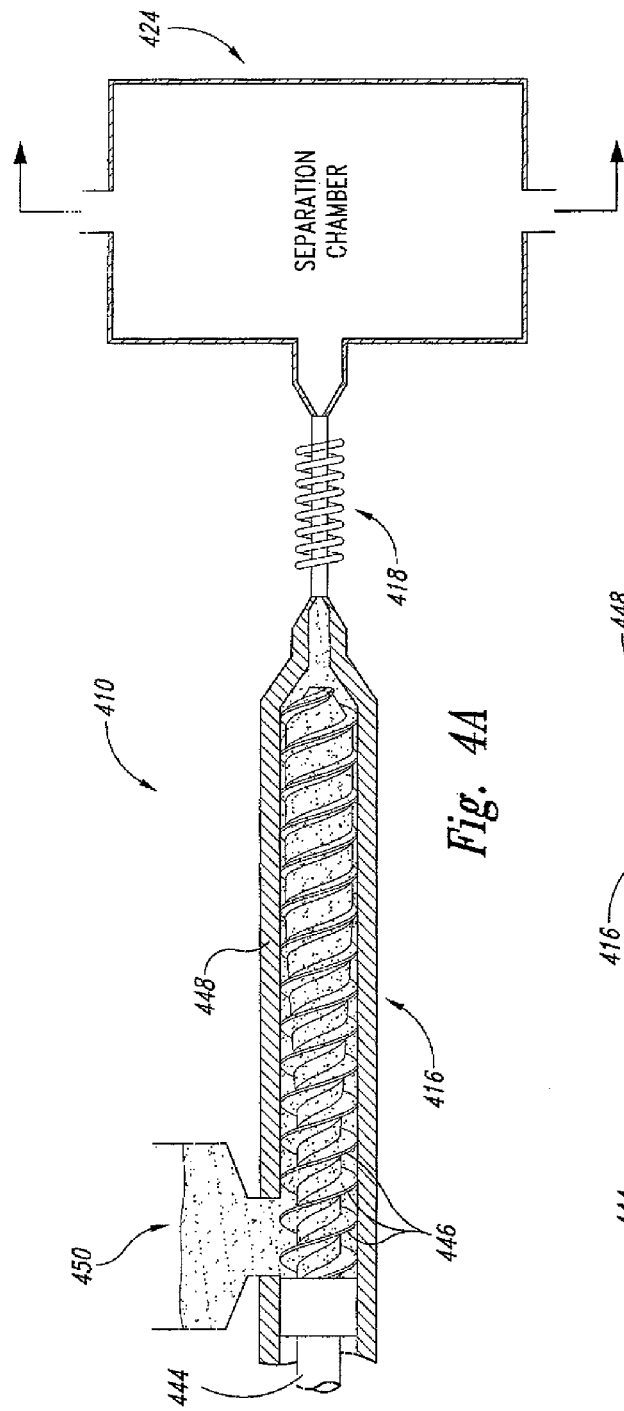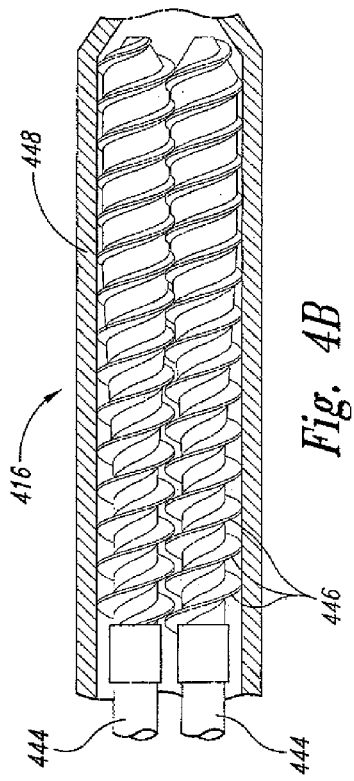

BIOMASS AND WASTE PLASTICS TO NEODIESEL AND VALUABLE CHEMICALS VIA SUPERCRITICAL WATER

CROSS-REFERENCE TO RELATED APPLICATIONS

This application is a continuation-in-part of U.S. application Ser. No. 12/402,489 filed on Mar. 11, 2009, which application claims the benefit of U.S. Provisional Application No. 61/035,380 filed on Mar. 11, 2008, and U.S. Provisional Application No. 61/110,505 filed on Oct. 31, 2008, which applications are all incorporated herein by reference in their entireties for all purposes.

TECHNICAL FIELD

The present invention relates generally to biomass and waste plastic conversion systems and, more specifically, to biomass and waste plastic conversion systems, apparatuses, and related methods that utilize supercritical water to transform naturally occurring and synthetic polymers into smaller molecules.

BACKGROUND OF THE INVENTION

Everyday the Sun pours down onto the Earth a vast quantity of radiant energy many many times greater than the total now used by Man. Some of this energy, together with carbon dioxide and water, Nature traps in trees and other plants by conversion into giant chemical molecules, collectively called biomass. The major components (about 60% to 80%) of this mixture are polysaccharides. These are long and substantially linear chains, the individual links of which are simple sugars. The remaining component (about 15% to 25%) is called lignin and is a complex network of joined aromatic rings of the type present in liquid diesel engine fuel. The energy trapped within plants can be recovered, in part, by breaking down the long chains into their constituent sugar links for subsequent standard fermentation into bioethanol. In contrast, the breakdown of the lignin network can yield simple aromatic compounds for possible direct incorporation into diesel fuel. The problem facing chemical engineers has been how to achieve these demonstrated chemical breakdowns on a large-scale, commercially practical, and energy efficient way.

There exists immense amounts of biomass materials in forests and crops, and cellulose, the main component, is one of the most abundant natural resources available on the Earth. In this regard, natural cellulosic feedstocks are now commonly referred to as "biomass," and biomass materials are known to generally consist primarily of cellulose (~40% to ~50%), hemicellulose (~20% to ~30%), and lignin (~15% to ~25%) bound together in a complex structure together with smaller amounts of pectins, proteins, and ash. Many types of biomass, including, for example, wood, paper, agricultural residues such as bagasse, switchgrass, wheat or sorghum straw, corn husks, and the like have long been considered as possible feedstocks for the manufacture of certain organic chemicals, but thus far existing biomass conversion technologies have achieved only limited success. It is believed by many that due to the complex chemical structure of most biomass materials, microorganisms and enzymes cannot effectively attack the cellulose component without prior treatment. Indeed, conventional methods for converting cellulose to glucose by way of acid hydrolysis and enzymatic saccharification are known to be inefficient and, consequently, are not yet commercially viable.

More recently, however, the chemical conversion of cellulose with supercritical water to obtain various sugars has been studied. (see, e.g., M. Sasaki, B. Kabyemela, R. Malaluan, S. Hirose, N. Takeda, T. Adschiri & K. Arai, Cellulose hydrolysis in subcritical and supercritical water, *J. Supercritical Fluids*, 13, 261-268 (1998); S. Saki & T. Ueno, Chemical conversion of various celluloses to glucose and its derivatives in supercritical water, *Cellulose*, 6, 177-191 (1999).) These more recent studies are among the first to demonstrate that cellulose may be rapidly hydrolyzed in supercritical water to yield glucose (in high yield) in either flow or batch type micro-reactors. The use of flow or batch type micro-reactors, however, is not a realistic option for the commercial-scale production of cellulosic based motor fuels.

Nowadays, everyone is aware of the desirability of having new domestic sources of liquid fuels for diesel as well as gasoline engines. Likewise, it is generally recognized that the USA has been living in the Age of Plastics for the past 75 years. This has become a throwaway age and multi-ton quantities of plastics are discarded daily all around the world.

In the major cities of the USA, it is now standard to have special bins everywhere in which recyclable material can be dumped. Originally this recyclable designation was restricted to paper and cardboard but now plastics in general are accepted. Strangely enough, in Seattle polystyrene foam and packaging material is excluded, and must be dumped in the regular garbage cans. The contents of the recycle bins are collected in a special truck and are transported to a municipal recycling center. There the various components are separated.

Now the discarded plastics, separated at the recycle center, consist of long chains of thousands of atoms called polymers. Of the commercially most important polymers, polystyrene (PS), polyethylene (PE) and polypropylene (PP), have chains that contain only carbon and hydrogen atoms in amounts similar to the hydrocarbons in diesel and gasoline fuels. Thus, the molecules in diesel and gasoline are chemically similar to the polymers but are much smaller in size. It has therefore been appreciated for some time that if the long chains of the plastics could be broken down into smaller pieces these moieties could find use as chemical feedstocks.

One of the most intriguing and environmentally sound approaches to breaking down plastics is simply to use water alone, heated to its supercritical state. About a decade ago this chemical-free technology was comprehensively discussed in an English language review by P. E. Savage (Chem. Rev. 1999, 99, 609). Since then few modern review have appeared. However, numerous articles, mostly from Japan and China, have appeared each year dealing with the treatment of plastics with supercritical water. All of these publications emphasize that when water is heated to 374.4 C or above, the pressure concomitantly generated is 217.7 atm and the water then becomes a powerful new reactive solvent. Temperatures above 400 C seem to make the water even more effective in its new role. For example, it now dissolves PS and breaks it down in 100% yield into a mixture of styrene, methylstyrene, styrene dimers and trimers, toluene, ethylbenzene, isopropylbenzene, 1,3-diphenylpropane and 1,3-diphenylbutane. (H. Kwak, H.-Y. Shin, S.-Y. Bae and H. Kumazawa, J. Appl. Poly. Sci. 2006, 101, 675). All of these substances are immiscible with water at room temperature and could be components of a diesel fuel.

These and numerous other similar reactions (J. A. Onwudili & P. T. Williams, Chemosphere 2009, 74(6), 787) demonstrate clearly that plastics can be broken down by treatment with supercritical water. Apparently the water and plastic undergoes the water gas reaction and hydrogen is released to combine with the chain fragments from the plastics. This has actually been demonstrated by the use of deuterium oxide in place of water and the consequent finding of deuterium in the fragments. However, since nearly all water-plastic reactions have been run in a batch mode on a very small scale, the chemistry so elegantly elucidated does not provide answers to the questions necessary for the future development of a commercially-sized, practical, continuous, supercritical water-based process.

As is commonly understand by those with backgrounds in chemical engineering, petroleum-based diesel fuels are produced from the fractional distillation of crude oil between 200° C. (392° F.) and 350° C. (662° F.) at atmospheric pressure, resulting in a mixture of carbon chains that typically contain between 8 and 21 carbon atoms per molecule. Diesel fuels are approximately similar to fuel oils used for heating (fuel oils no. 1, no. 2, and no. 4). All fuel oils consist of complex mixtures of aliphatic and aromatic hydrocarbons. The aliphatic alkanes (paraffins) and cycloalkanes (naphthenes) are hydrogen saturated and compose approximately 80-90% of the fuel oils. Aromatics (e.g., benzene) and olefins (e.g., styrene and indene) compose 10-20% and 1%, respectively, of the fuel oils. Fuel oil no. 1 (straightrun kerosene) is a light distillate which consists primarily of hydrocarbons in the C9-C16 range; fuel oil no. 2 is a heavier, usually blended, distillate with hydrocarbons in the C11-C20 range. Straight-run distillates may also be used to produce fuel oil no. 1 and diesel fuel oil no. 1. Diesel fuel no. 1 and no. 2 are similar in chemical composition to fuel oil no. 1 and fuel oil no. 2, respectively, with the exception of the additives. Diesel fuels predominantly contain a mixture of C10 through C19 hydrocarbons, which include approximately 64% aliphatic hydrocarbons, 1-2% olefinic hydrocarbons, and 35% aromatic hydrocarbons.

Accordingly, and although some progress has made with respect to the development of biomass and/or waste plastic conversion systems, there is still a need in the art for new and improved machines, systems, and methods for converting biomass and/or waste plastics into simple sugars, hydrocarbons, and aromatic chemicals which, in turn, can be readily converted into liquid transportation fuels. The present invention fulfills these needs and provides for further related advantages.

SUMMARY OF THE INVENTION

The present invention in one embodiment is directed to a supercritical fluid polymer conversion systems and related method for converting biomass and/or waste plastics into a plurality of reaction products including simple sugars, hydrocarbons, and various aromatic compounds that, in turn, can be converted into "neodiesel." In one embodiment, the present invention is directed to a "static" polymer depolymerisation reactor for converting a selected biomass and/or waste plastic material into a plurality of reaction products, and comprises: a reaction zone within a housing having a central axis; and an electromagnetic induction heating system in an operative relationship with the reaction zone. Unlike polymer depolymerisation systems known in the art, the present invention may be characterized in that it further comprises a centralized induction heating system. The centralized electromagnetic induction heating system of the present invention comprises an alternating current power supply electrically connected to an induction coil, and the induction coil is positioned circumferentially about the central axis of the housing. In this configuration, the induction coil, when energized, passes an alternating electrical current that simultaneously generates a transverse alternating magnetic field—a transverse alternating magnetic field that induces eddy currents and heating within the metallic housing that surrounds the reaction zone (and possibly enhances the rapid cleavage and depolymerization of various long-chain polymeric molecules into their more fundamental simple sugars and aromatic compound chemical building blocks).

In another embodiment, the present invention is directed to a "dynamic" supercritical fluid polymer depolymerisation system for continuously converting a selected biomass and/or waste plastic material into a plurality of reaction products, and comprises, in fluidic series: a polymeric material conveying zone; a supercritical fluid reaction zone within an electrically conductive housing and about a central axis; and a reaction product quenching/separation zone. This embodiment may also be characterized in that it further comprises a centralized induction heating system, which system includes an alternating current power supply electrically connected to an induction coil. The induction coil is circumferentially positioned about the central axis, as well as the electrically conductive housing of the supercritical fluid reaction zone. In this configuration, the induction coil, when energized, passes an alternating electrical current that simultaneously generates a transverse alternating magnetic field.

In yet another embodiment, the selected biomass and/or waste plastic material is mixed together with water and a plurality of electrically conductive particles such as, for example, graphite or coal particles, and this admixture is then flowingly conveyed through the supercritical fluid reaction zone while the induction coil is energized such that the plurality of electrically conductive particles are inductively heated (as a result of passing through the alternating magnetic field that has been created within the supercritical fluid biomass conversion zone), thereby enhancing and/or otherwise facilitating heat transfer and chemical reactions occurring within the supercritical fluid biomass conversion zone.

In a still further embodiment, the present invention is directed to a composition of matter that consists essentially of a mixture of a biomass and/or waste plastic material, water, and a plurality of electrically conductive particles (capable of being inductively heated when under the influence of an alternating magnetic field), wherein the water component of the mixture is at supercritical conditions.

In a still further embodiment, the present invention is directed to an extruder-based supercritical fluid polymer depolymerisation machine especially configured for converting raw biomass and/or waste plastic materials such as, for example, wood chips, waste plastics, agricultural residue and the like into a plurality of reaction products, and comprises, in fluidic series: an elongated extruder-based polymeric material conveying zone; a supercritical fluid reaction zone; and a reaction product quenching/separation zone. This embodiment may be characterized in that the elongated polymeric material conveying zone contains two or more elongated rotatable shafts having a plurality of flighted screws positioned lengthwise within an elongated conveying section housing (thereby defining an extruder). The plurality of flighted screws are positioned about each respective two or more elongated rotatable shafts, and the two or more elongated rotatable shafts are configured to continuously convey the selected biomass and/or waste plastic material from an upstream polymeric material inlet to the supercritical reaction zone while increasing the pressure of the selected biomass and/or waste plastic material from about atmospheric at the polymeric material inlet to greater than about 22.1 MPa at the supercritical fluid reaction zone.

These and other aspects of the present invention will become more evident upon reference to the following detailed description and accompanying drawings. It is to be understood, however, that various changes, alterations, and substitutions may be made to the specific embodiments disclosed herein without departing from their essential spirit and scope.

BRIEF DESCRIPTION OF THE DRAWINGS

The drawings are intended to be illustrative and symbolic representations of certain exemplary embodiments of the present invention and as such they are not necessarily drawn to scale. In addition, it is to be expressly understood that the relative dimensions and distances depicted in the drawings (and described in the "Detailed Description of the Invention" section) are exemplary and may be varied in numerous ways. Finally, like reference numerals have been used to designate like features throughout the several views of the drawings.

FIG. 3A shows a side perspective view of a "dynamic" supercritical fluid polymer depolymerization system in accordance with an embodiment of the present invention, wherein an alternating electrical current is passing through an induction coil so as to generate a transverse alternating magnetic field.

FIG. 4A shows a side elevational cross-sectional view of an extruder-fed induction-heated supercritical fluid polymer depolymerization system in accordance with an embodiment of the present invention.

FIG. 4B shows a top cross-sectional view of the extruder section of the extruder-fed induction-heated supercritical fluid polymer depolymerization system shown in FIG. 4A.

DETAILED DESCRIPTION OF INVENTION

Figure 1A:
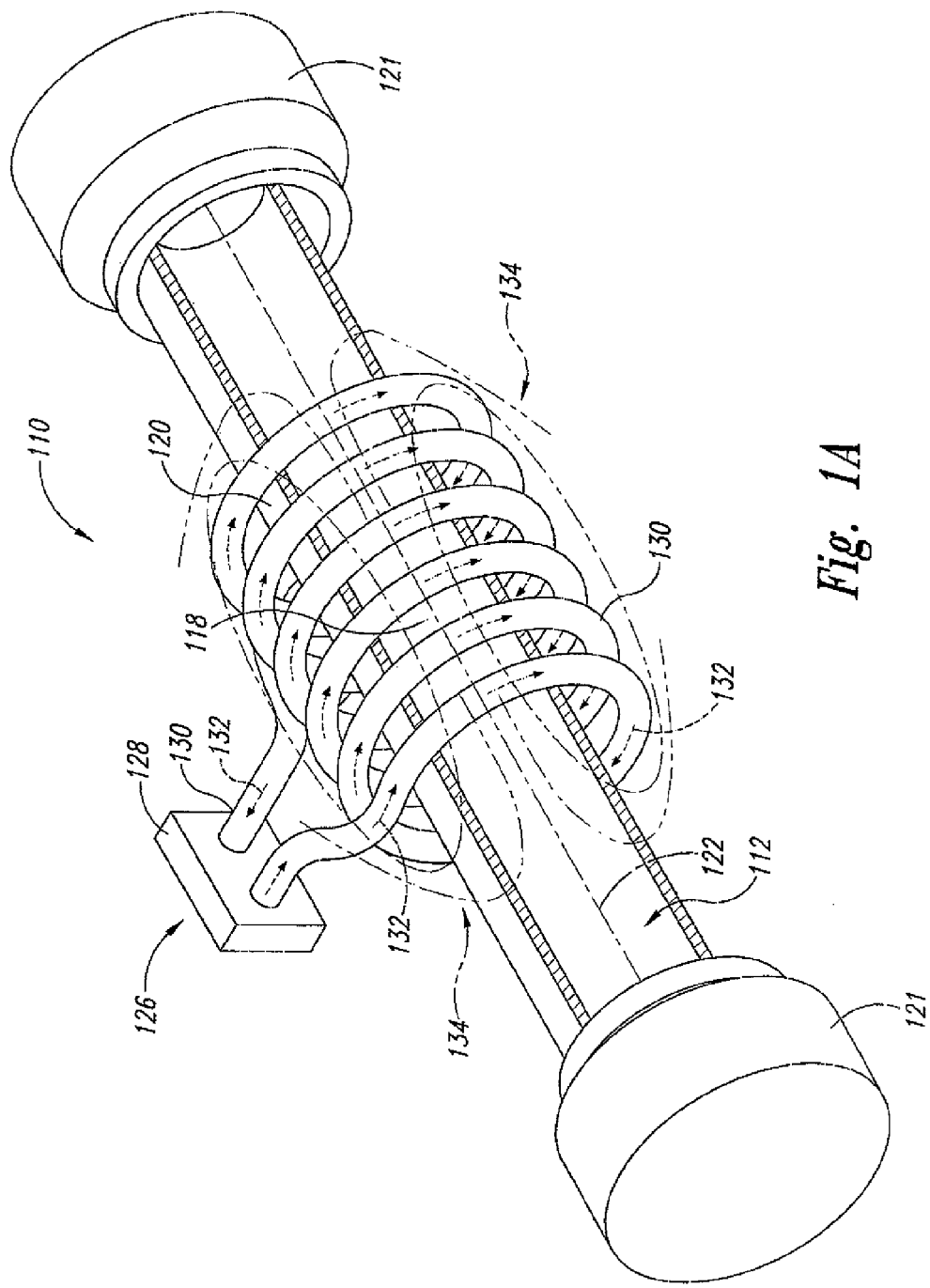
FIG. 1A shows a side perspective view of a "static" supercritical fluid polymer depolymerization system in accordance with an embodiment of the present invention, wherein an alternating electrical current is passing through an induction coil so as to generate a transverse alternating magnetic field.
Figure 1B:
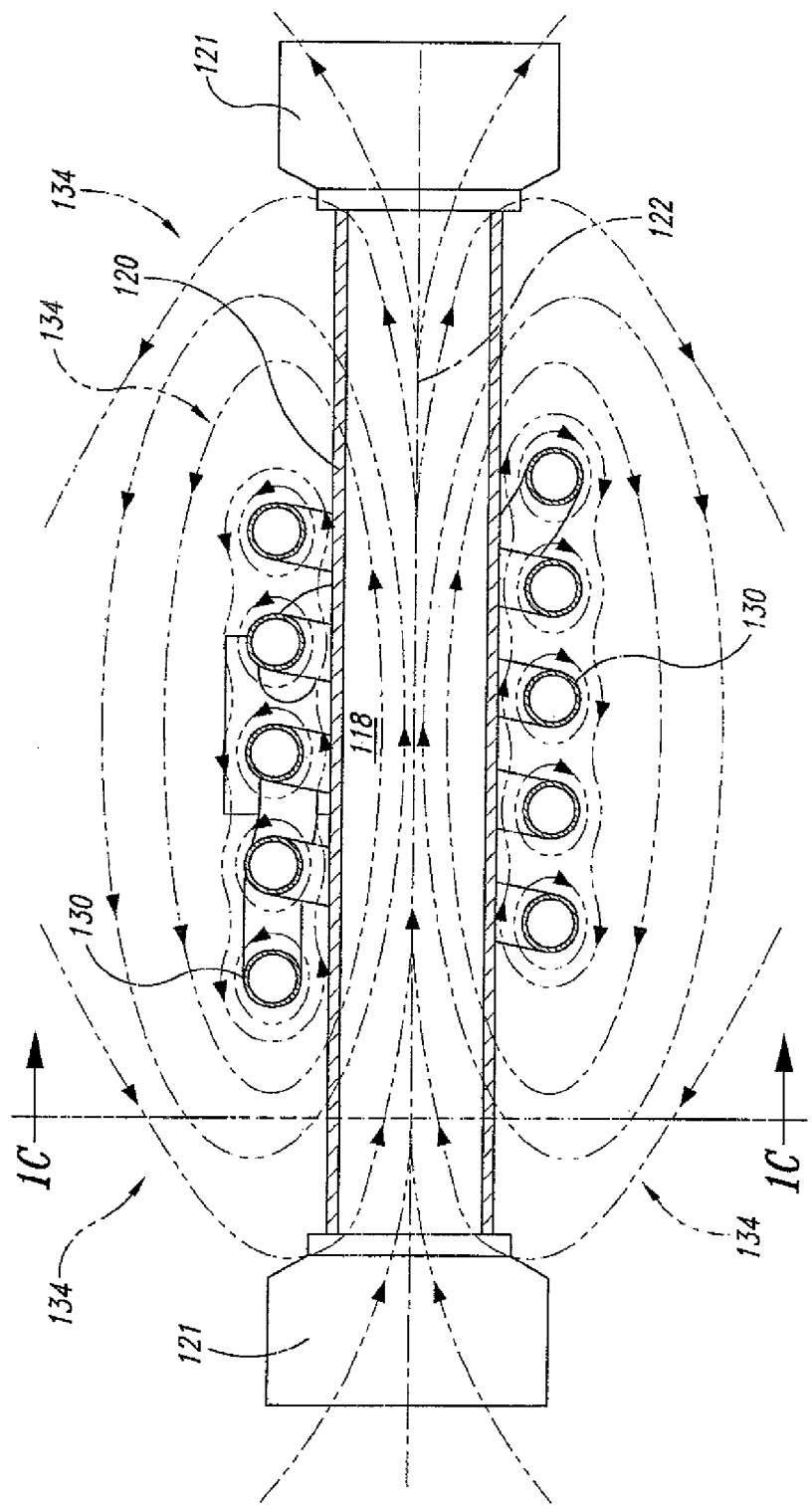
FIG. 1B shows a side cross-sectional view of the supercritical fluid polymer depolymerization system shown in FIG. 1A.
Figure 1C:
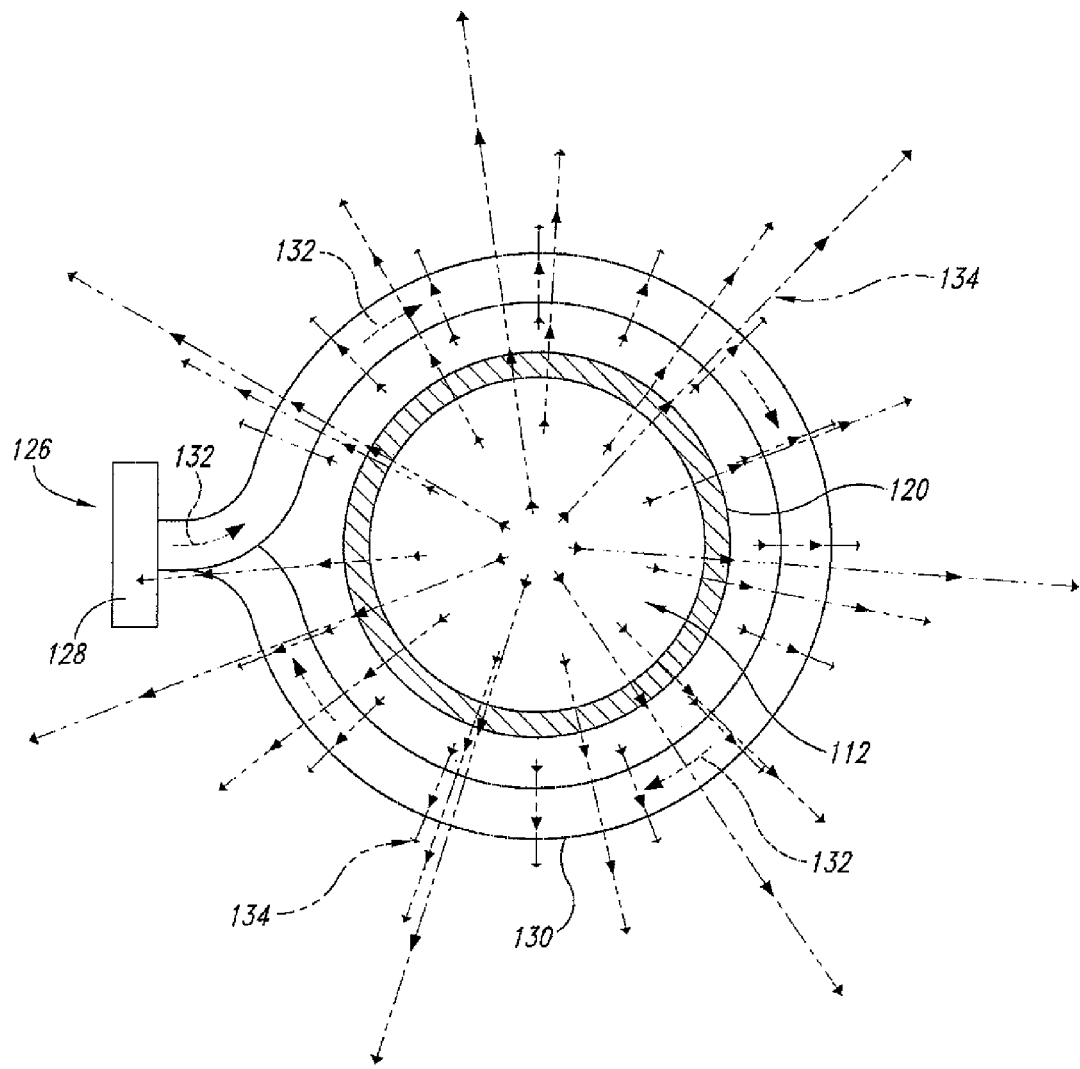
FIG. 1C shows an end view of the supercritical fluid polymer depolymerization system shown in FIGS. 1A and 1B.

Referring now to the drawings where like numerals have been used to designate like features throughout the several views, and more specifically to FIGS. 1A-C, the present invention in a first embodiment is directed to a "static" supercritical fluid biomass conversion system 110 for converting a selected biomass material 112 into a plurality of reaction products (not shown). In the context of the present invention, the term "biomass" means any plant derived organic matter, including dedicated energy crops and trees, agricultural food and feed crops, agricultural crop wastes and residues, wood wastes and residues, aquatic plants, algae, animal wastes, municipal wastes, and other like organic materials. As shown, the polymer conversion system 110 comprises: a reaction zone 118 within a housing 120 having a central axis 122 (all of which define a polymer depolymerization reactor 223 as best shown separately in FIGS. 2A-C); and a centralized electromagnetic induction heating system 126 in an operative relationship with the housing 120 and the reaction zone 118. The housing 120 is preferably tubular (e.g., cylindrical) in shape and includes a pair of threaded end caps 121 connected at each end, thereby ensuring that the reaction zone 118 is sealed from the outside environment. The end caps 121 may each include a central through-hole (not shown) that allows for placement of temperature and pressure sensors within the reaction zone 118. For reasons that will become more apparent in view of the further embodiments of the present invention set forth below, the housing 120 may be made of an electrically conductive metal (e.g., stainless steel), and/or an electrically nonconductive material (e.g., a glass or ceramic material) that is substantially transparent to alternating magnetic fields and other irradiation sources like, for example, gamma rays, electron beams, and microwaves.

Figure 2A:
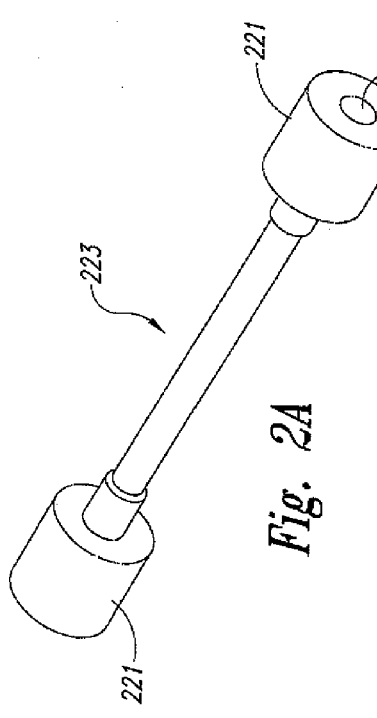
FIGS. 2A-C show various views of a supercritical fluid biomass conversion reactor in accordance with an embodiment of the present invention.
Figure 2B:
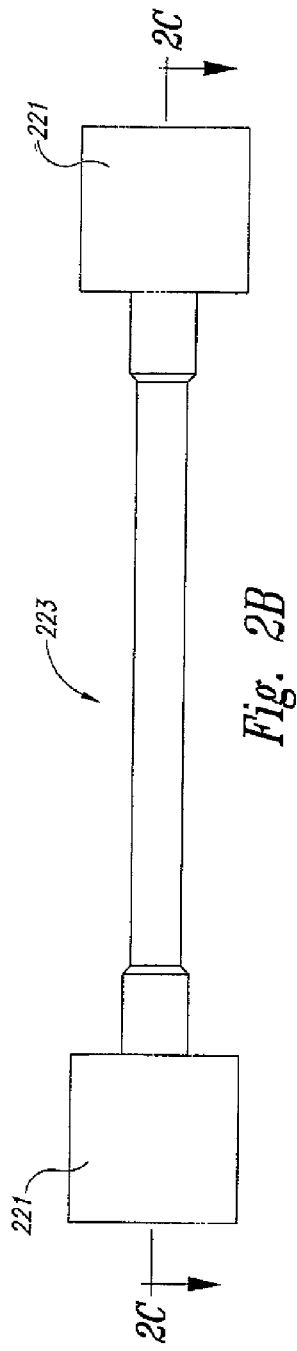
Figure 2C:
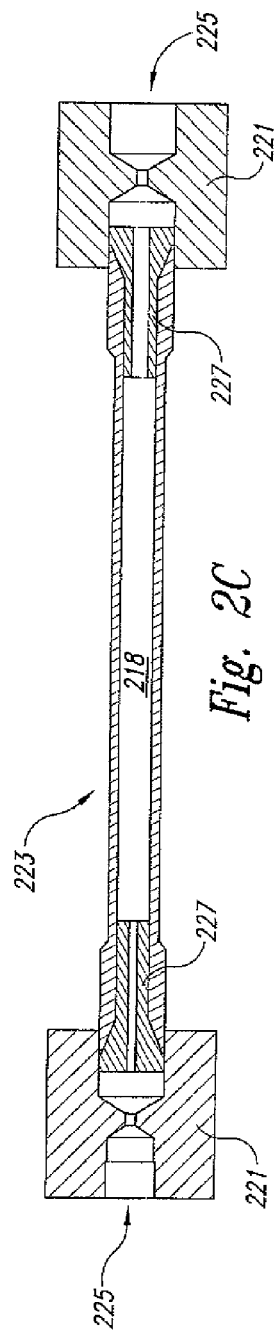

As best shown in FIGS. 2A-C, the polymer depolymerization reactor 223 in an embodiment comprises a cylindrical stainless steel tube having a pair of threaded ends caps 221 threadedly engaged about the end portions of the tube. The end caps 221 each include a central through-hole 225 that allows for placement of temperature and pressure sensors within a reaction zone 218 defined by the inner volume of the tube. To this end, the polymer depolymerization reactor 223 further comprises a pair of snuggly fitting ferrules 227 positioned at and within the end portions of the tube. In this configuration, the ferrules 227 allow for the proper and secure placement of respective temperature and pressure sensing probes (not shown) within the reaction zone 228.

The reaction zone 218 associated with the polymer depolymerization reactor 223 is preferably completely filled with a selected water laden biomass and/or waste plastic material (e.g., polypropylene (PP), polyethylene (PE), and polystyrene (PS) that is substantially devoid of air. In this regard, the water content of the selected water laden biomass and/or waste plastic material preferably ranges from (1) at least 15%, (2) about 20% to about 50%, or (3) about 10% to about 90% by weight. Rapid heating of the sealed reactor causes the water laden biomass and/or waste plastic material to gain energy, which concomitantly results in increased temperature and pressure within the reactor zone 218. Indeed, it is preferable to heat the water laden biomass and/or waste plastic material that occupies the reactor zone 218 to a temperature of at least 374.4° C. (thereby also increasing the pressure within the reactor zone 218 to above 218 atm), and for a period of time that preferably ranges from about 0.4 to about 10 seconds (but may be may for much longer periods time up to an hour or longer). In so doing, and without necessarily prescribing to any particular scientific theory, it is believed that at these conditions the water component is at a supercritical state, thereby enabling (in the context of a selected biomass material) the rapid hydrolysis and depolymerization of the surrounding biomass's main polysaccharide components (cellulose and hemicellulose) into one or more fermentable sugars, and the main polyphenolic components into one or more simple aromatic compounds. In addition, a phenolic compound may be added to the water laden biomass material to retard the formation of certain degradation reaction products.

In the context of one or more waste plastics, supercritical water (SCW) breaks down polyethylene (PE) by cleaving the carbons at various locations along the backbone and simultaneously capturing hydrogen atoms from the water. As a consequence a whole range of linear hydrocarbons of various lengths are formed. Most of these have been found to be soluble in regular gasoline and may be most readily utilized in the automobile fuel market. In the case of polypropylene (PP) the breakdown fragments will not be linear, but branched, because of the side chain methyl groups on every other carbon atom in the polymer backbone. These branched structures have been found to be even more soluble in gasoline than their counterparts from polyethylene. Again, the specific fuel market will likely be for trucks and automobiles at some percentage addition value. When the starting renewable plastic is polystyrene (PS), the breakdown fragments are somewhat different because supercritical water does not readily cleave aromatic rings. The aliphatic backbone chain of polystyrene is of course cut by the supercritical water as with polyethylene and polypropylene backbones, but the polystyrene-derived fragments contain aromatic rings that originate from the phenyl rings. Thus, the supercritical water product has been found to be more like the aromatic components of kerosene with its alkylbenzenes currently usable in diesel. These aromatic higher boiling substances have been found to be more compatible with diesel fuel usage rather than gasoline.

As best shown in FIGS. 1A-C, the centralized electromagnetic induction heating system 126 component comprises an alternating current power supply 128 electrically connected to a helically-shaped induction coil 130, and the induction coil 130 is positioned circumferentially about the central axis 122 of the housing 120. In this configuration, the induction coil 130, when energized, passes an alternating electrical current 132 that, in turn, simultaneously generates a transverse alternating magnetic field 134. As further shown, the transverse alternating magnetic field 134 penetrates and partially resides within at least a portion of the reaction zone 118. Without necessarily prescribing to any particular scientific theory, it is believed that the presence of the alternating magnetic field 134 within the reaction zone 118 enhances and/or otherwise facilitates the rapid cleavage and reaction of various long chain polymeric molecules into more fundamental chemical building blocks (such as, for example, simple hydrocarbons, sugars, and various aromatic compounds).

Unlike conventional heating systems based on convective heat transfer principles, induction heating is generally considered to be a complex combination of electromagnetic, heat transfer, and metallurgical phenomena. In this regard, an alternating voltage applied to an induction coil (e.g., solenoid coil) in accordance with the present invention results in an alternating current in the coil circuit. The generated alternating coil current will, in turn, produce in its surroundings a time-variable magnetic field that has the same frequency as the coil current. This magnetic field induces eddy currents in the workpiece located inside the coil. Eddy currents will also be induced in other electrically conductive objects that are located near the coil. These induced currents have the same frequency as the coil current; however, their direction is opposite to the coil current. These currents produce heat by way of the Joule effect ($I^2R$), which is a physical law expressing the relationship between the heat generated by the current flowing through a conductor.

Stated somewhat differently, in induction heating a source of high frequency electricity is used to drive a large alternating current through a coil. This coil is known as the work coil. The passage of current through this coil generates a very intense and rapidly changing magnetic field in the space surrounding and within the work coil. The workpiece to be heated (i.e., metallic tubular reactor filled with water laden biomass and/or waste plastic materials) is placed within this intense alternating magnetic field. The alternating magnetic field induces a current flow in the conductive workpiece. The arrangement of the work coil and the workpiece can be thought of as an electrical transformer. The work coil is like the primary where electrical energy is fed in, and the workpiece is like a single turn secondary that is short-circuited. This arrangement causes tremendous currents to flow through the workpiece. These currents are known as eddy currents. In addition, the high frequency alternating electrical current used in induction heating gives rise to a phenomenon referred to as the "skin effect." This skin effect forces the alternating current to flow in a thin layer near the surface of the workpiece. The skin effect increases the effective resistance of the metal to the passage of the large current, thereby further increasing the heating effect.

For ferrous metals like iron and some types of steel, there is an additional heating mechanism that takes place at the same time as the eddy currents mentioned above. In this regard, the intense alternating magnetic field inside the work coil repeatedly magnetises and de-magnetises the iron crystals of the metallic workpiece. This rapid flipping of the magnetic domains causes considerable friction and heating inside the metal material (i.e., metallic tubular reactor filled with water laden biomass and/or waste plastic materials). Heating due to this mechanism is known as Hysteresis loss, and is greatest for materials that have a large area inside their B-H curve. This can be a large contributing factor to the heat generated during induction heating, but only takes place inside ferrous materials. For this reason ferrous materials lend themselves more easily to heating by induction than non-ferrous materials. It is interesting to note that steel loses its magnetic properties when heated above approximately 700° C., which temperature is known as the Curie temperature.

Figure 3B:
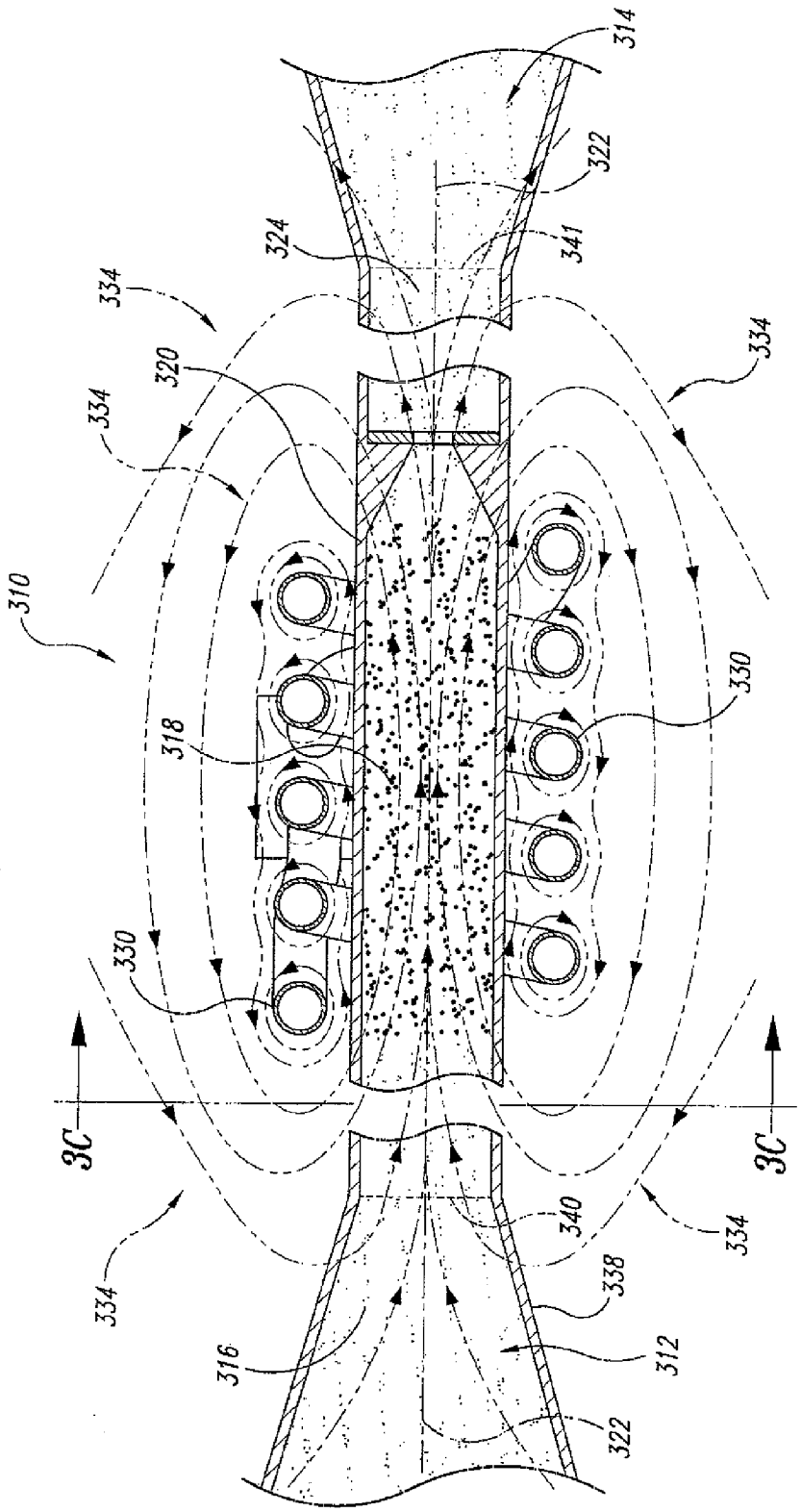
FIG. 3B shows a side cross-sectional view of the supercritical fluid polymer depolymerization system shown in FIG. 3A.
Figure 3C:
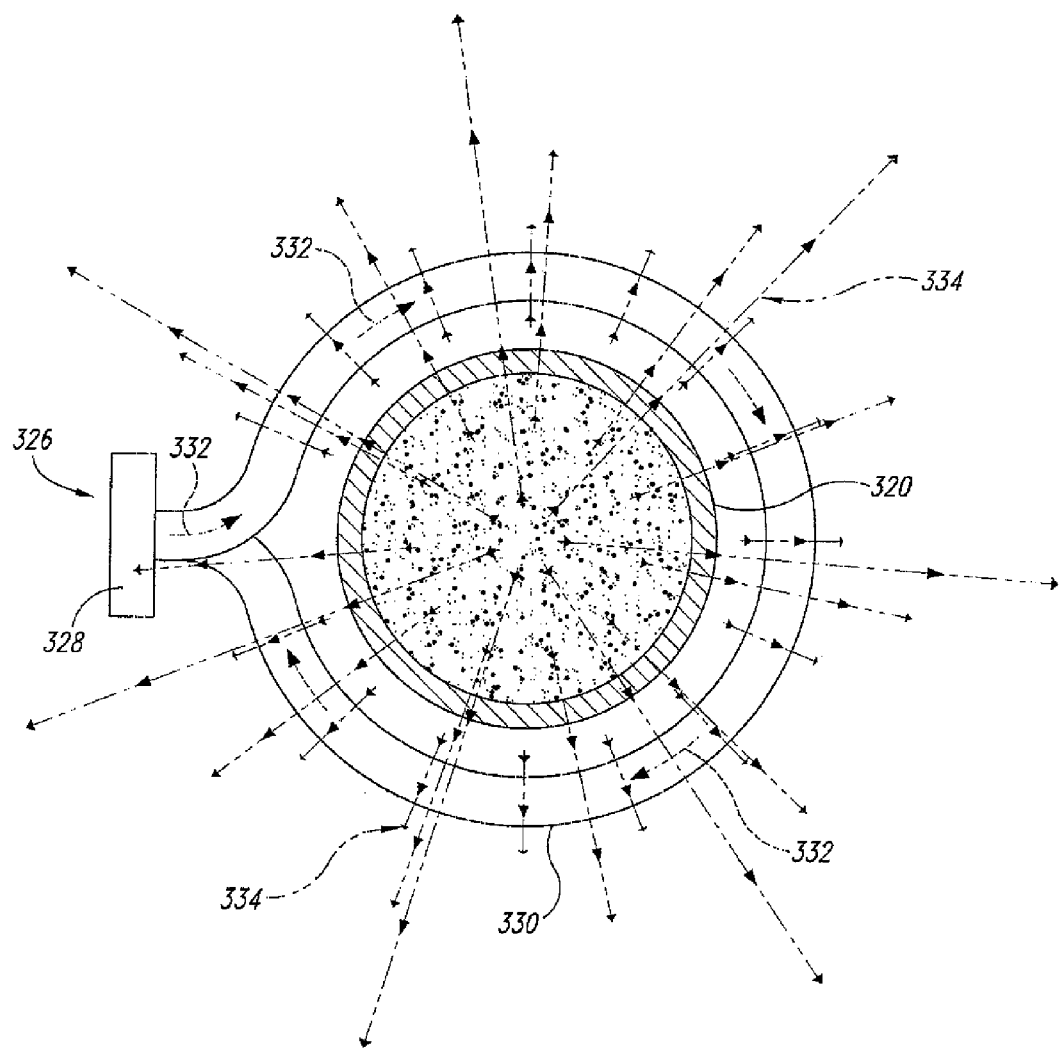
FIG. 3C shows an end view of the supercritical fluid polymer depolymerization system shown in FIGS. 3A and 3B.

In another embodiment and as shown in FIGS. 3A-C, the present invention is also directed to a "dynamic" supercritical fluid polymer depolymerization system 310 for continuously converting a selected polymeric material flowstream 312 into a plurality of reaction products 314, and comprises, in fluidic series: a conveying zone 316; a supercritical fluid reaction zone 318 within an electrically conductive housing 320 and about a central axis 322; and a reaction product quenching/separation zone 324. The supercritical fluid polymer depolymerization system 310 may be characterized in that it further comprises an induction heating system 326 that includes an alternating current power supply 328 electrically connected to an induction coil 330. As shown, the induction coil 330 is concentrically positioned about the central axis 322 and the electrically conductive housing 320 of the supercritical fluid reaction zone 318. The induction coil 330 is configured to pass therethrough an alternating electrical current 332 that simultaneously generates a transverse alternating magnetic flux (schematically depicted as spaced apart magnetic field lines 334). As further shown, the alternating magnetic flux passes through and partially resides within at least a portion of the supercritical fluid reaction zone 218.

As shown, the conveying zone 316 is positioned within a conveying section housing 338 fluidically connected to the supercritical fluid reaction zone housing 320, wherein the biomass and waste plastic material 312 that is flowing within the conveying zone 316 (1) funnels into the supercritical fluid reaction zone 318 by way of one or more inlet orifices 340, and (2) funnels out of the supercritical fluid reaction zone 318 and into the quenching/separation zone 324 by way of one or more outlet orifices 341. Each inlet orifice 340 may define a converging nozzle. Similarly, each outlet orifice 340 may define a diverging nozzle. Thus, the electrically conductive housing 320 that surrounds the reaction zone 318 defines a converging-diverging nozzle.

The supercritical fluid polymer depolymerization system 310 may in certain embodiments further comprise a plurality of electrically conductive particles 336 dispersed throughout the selected water laden biomass and/or waste plastic material. In this way, the selected biomass and/or waste plastic material together with water and the plurality of electrically conductive particles are capable of flowingly passing through the supercritical fluid reaction zone 316. In so doing, the plurality of electrically conductive particles are heated by means of electromagnetic induction as a result of passing through the alternating magnetic field (thereby facilitating heat transfer throughout the biomass and/or waste plastic material). The plurality of electrically conductive articles may comprise a metal, an alloy, coal, graphite, and the like.

Thus, and in other embodiments, the present invention is also directed to a composition of matter that consists essentially of a mixture of a polymeric material (i.e., biomass and/or waste plastics), water, and a plurality of electrically conductive particles capable of being inductively heated when under the influence of an alternating magnetic field, wherein the water component of mixture is at a supercritical state. The polymeric material may be in an amount ranging from about 10 to about 88 percent by weight, the water may be in an amount ranging from about 12 to about 90 percent by weight, and the plurality of electrically conductive particles may be in an amount of less than about 1 percent by weight. Alternatively, the polymeric material may in an amount ranging from about 30 to about 60 percent by weight, the water may be in an amount ranging from about 40 to about 70 percent by weight, and the plurality of electrically conductive particles may be in an amount of less than about 5 percent by weight. The electrically conductive particles are preferably substantially spherical in shape and preferably have diameters in the range of about 5 to about 500 microns.

In yet another embodiment and as shown in FIGS. 4A-B, the present invention is also directed to an extruder-fed induction-heated supercritical fluid polymer depolymerization machine/system 410 that comprises, in fluidic series: an elongated conveying zone 416; a supercritical fluid reaction zone 418; and a reaction product quenching/separation zone 424. In this embodiment, the elongated conveying zone 416 contains two or more elongated rotatable shafts 444 having a plurality of flighted screws 446 positioned lengthwise within an elongated conveying section housing 448. The plurality of flighted screws 446 are positioned about each respective two or more elongated rotatable shafts 444, which shafts are configured to continuously convey the selected biomass and/or waste plastic material (not shown) from an upstream inlet 450 to the supercritical fluid reaction zone 418 while increasing the pressure of the selected biomass and/or waste plastic material from about atmospheric at the inlet 450 to greater than about 22.1 MPa at the supercritical fluid reaction zone 418. Each of the pair of intermeshing extruder screw elements may be tapered with the fat end being positioned adjacent to the supercritical fluid reaction zone 418. Each fat end of each extruder screw element may include a cone section configured to coaxially fit within the one or more funnel shaped orifices that feeds into the supercritical fluid reaction zone 418.

In this embodiment, the two or more elongated rotatable shafts 444 having a plurality of flighted screws 446 define a pair of intermeshing extruder screw elements. The intermeshing extruder screw elements may be either co-rotatable or counter rotatable. In addition, the pair of intermeshing extruder screw elements further defines a plurality of discrete C-shaped chambers positioned lengthwise about each of the pair of intermeshing screw elements.

Figure 5:
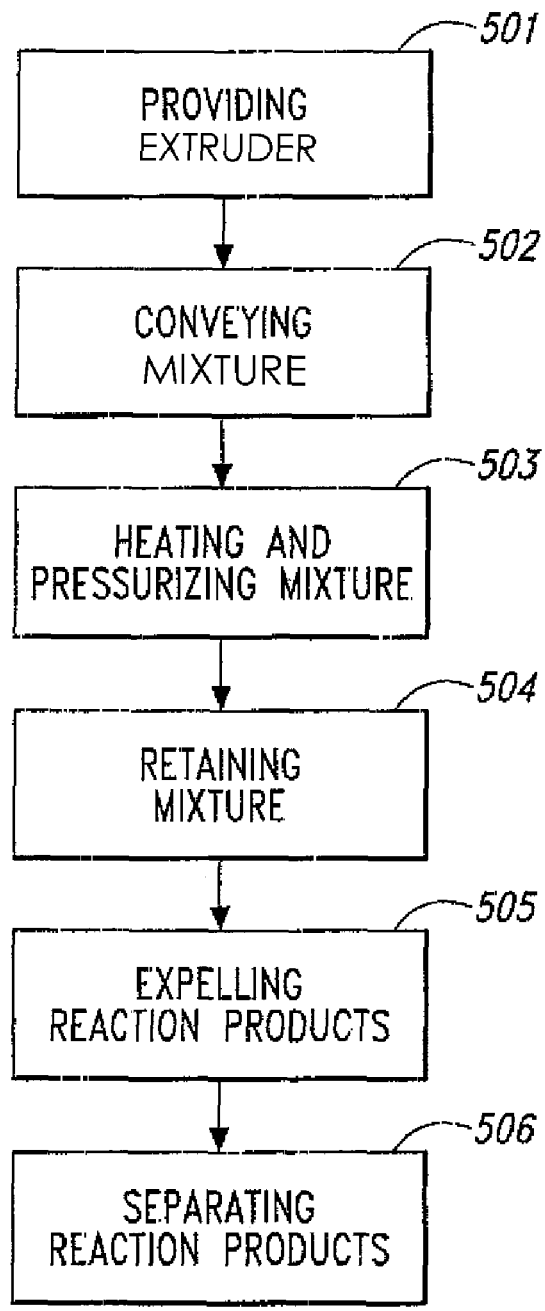
FIG. 5 is a block diagram of a method for making a plurality of reaction products from a selected biomass and/or waste plastic material in accordance with an embodiment of the present invention.
Figure 6:
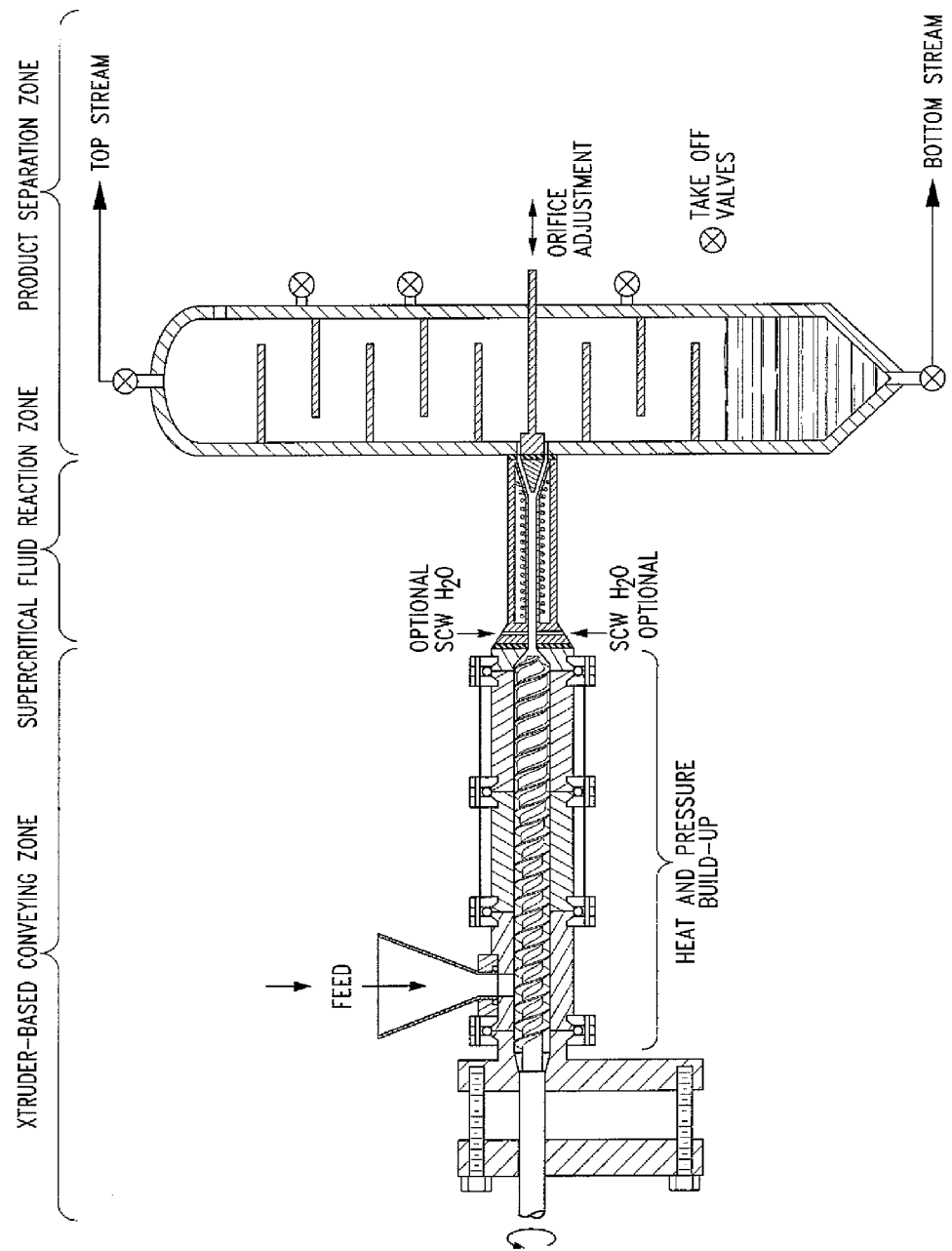
FIG. 6 shows an alternative embodiment of the present invention.

The present invention is also directed to a method for converting a selected biomass and/or waste plastic material into a plurality of reaction products. As shown in FIG. 5 and FIG. 6, the method comprises the steps of: providing 501 an elongated conveying zone that contains two or more elongated rotatable shafts having a plurality of flighted screws positioned lengthwise within an elongated conveying section housing, wherein the plurality of flighted screws are positioned about each respective two or more elongated rotatable shafts, and wherein the two or more elongated rotatable shafts are configured to continuously convey the selected biomass and/or waste plastic material together with water from an upstream inlet to a supercritical fluid reaction zone while increasing the pressure of the selected biomass and/or waste plastic material and water from about atmospheric at the inlet to greater than about 22.1 MPa at the supercritical fluid biomass conversion zone; conveying 502 a mixture of the selected biomass and/or waste plastic material and water through the elongated conveying zone and into the supercritical fluid reaction zone; heating and further pressurizing 503 the mixture within the supercritical fluid reaction zone to yield at least supercritical water, wherein heat energy is supplied by means of an induction heating coil positioned circumferentially about the supercritical fluid reaction zone; retaining 504 the mixture within the supercritical fluid reaction zone for a period of time sufficient to yield the plurality of reaction products; expelling 505 the plurality of reaction products out of the supercritical fluid reaction zone and into a quenching/separation zone; and separating 506 the plurality of reaction products into at least a water soluble fraction and an organic solvent soluble fraction. In this method, the period of time that the mixture is retained within the supercritical fluid reaction zone generally ranges from about 0.4 to about 10 seconds (but may include much greater periods of time up to an hour and above). This method may also comprises the further steps of adding a phenolic compound 507 to the plurality of reaction products to thereby retard the formation of certain degradation reaction products, as well as a step of adding a plurality of electrically conductive particles 508 to the mixture of the selected biomass and/or waste material and water such the plurality of electrically conductive particles are heated while passing through the induction coil.

Finally, and for purposes of efficient heat transfer across the flowing biomass and/or waste plastic material fluid stream, it is contemplated that a suitable heat transfer agent such as, for example, a heavy petroleum oil or oil shale, or a recyclable low melting metal (tin, mp 232° C. or lead, mp 327° C.) or metal alloy, preferably Wood's metal (an alloy of Bismuth 50%, Cadmium 12.5%, Lead 25% and Tin 12.5%, mp 73-77° C.) may be added to biomass and/or waste plastic material feedstock prior to its introduction into the co-rotating twin screw extruder.

For purposes of illustration and not limitation, the following example more specifically discloses certain exemplary test materials, methods, and results associated with a supercritical fluid biomass conversion systems made in accordance with the present invention.

EXAMPLES

We, the inventors of the various embodiments disclosed herein, conceived, designed, built, and successfully tested the world's first electromagnetic induction heated supercritical fluid polymer depolymerization machine. In this regard, our novel polymer depolymerization machine validates our concept of rapidly converting selected biomass and/or waste plastic materials into a plurality of reaction products including glucose (and other fermentable sugars), hydrocarbons, and various aromatic compounds that, in turn, are readily convertible into liquid motor fuel, collectively referred to as "neodiesel." To this end and for purposes of validation, we built a series of cylindrical shaped stainless steel (15-5 SST) pressure vessels having wall thicknesses of about 0.062 inches (as shown and described in the engineering drawings denoted as FIGS. 4A-F) and having an internal volume of about 3.0 ml. We also acquired an electromagnetic induction heating system (model SP-16A Induction Heater available from MTI Corporation, U.S.A.), and specially modified it such that it would, among other things, horizontally retain each pressure vessel under test within a closely wound (5 turns) helical induction coil made of ¼ inch copper tubing. Each fully loaded pressure vessel was then subjected to a time-variable magnetic field by energizing the induction coil with alternating electric current that ranged from about 50-100 KHZ for a period of time ranging from about 2 to 5 seconds. After energizing, each vessel was rapidly cooled by way of quenching with a cascading flowstream of water. In our experimental set-up, we were able to completely liquefy a water laden solid hardwood into a yellowish brown liquid mixture that felt slippery and oily indicating that we had indeed achieved a biomass transformational success! In addition, we were also able to successfully liquefy water laden polypropylene (PP), polyethylene (PE), and polystyrene (PS) samples into liquid hydrocarbons mixtures, hydrocarbon mixtures that were further found to be soluble in liquid gasoline and diesel fuels.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. A supercritical fluid reaction apparatus for transforming a selected polymeric material flowstream into a plurality of reaction products, comprising, in fluidic series:
    an extruder;
    a supercritical fluid reaction zone connected to the extruder and one or more supercritical water flowstreams, the supercritical fluid reaction zone being proximate to a circumferentially positioned heater, with the heater being configured to transfer heat to the selected polymeric material flowstream admixed together with water to supercritical conditions to thereby facilitate chemical reaction so as to yield the plurality of reaction products; and
    a reaction products separation chamber connected to the supercritical fluid reaction zone, the reaction products separation chamber containing both an aqueous phase and a non-aqueous phase, and being configured to cool and separate by way of exits portals the plurality of reaction products into two or more reaction product flowstreams, the reaction zone defining a tube extending from the extruder to the chamber, with the water flowstreams connected to the tube separately from the zone and the chamber.

2. The supercritical fluid reaction apparatus of claim 1, further comprising an upstream hopper connected to the extruder, wherein the extruder is configured to continuously convey the selected polymeric material flowstream from the upstream hopper to the supercritical fluid reaction zone while increasing the pressure of the selected polymeric material flowstream admixed together with water from about atmospheric at an upstream hopper to greater than about 22.1 MPa at the supercritical reaction zone.

3. The supercritical fluid reaction apparatus of claim 2 wherein the supercritical fluid reaction zone is contained within a central tube, and wherein the circumferentially positioned heater comprises an electromagnetic induction heating system, the electromagnetic induction heating system including an alternating current power supply electrically connected to an induction coil, with the induction coil being circumferentially positioned about the central tube, and with the induction coil being configured to pass therethrough an alternating electrical current that simultaneously generates a transverse alternating magnetic field, and with the transverse alternating magnetic field being capable of inductively heating the central tube to a selected temperature.

4. The supercritical fluid reaction apparatus of claim 3 wherein the reaction products separation chamber includes therein a plurality of horizontally positioned separation plates.

5. The supercritical fluid reaction apparatus of claim 4 wherein the reaction products separation chamber includes a bottom exit portal for removal of the aqueous phase, and
    a top exit portal for removal of the non-aqueous phase.

6. The supercritical fluid reaction apparatus of claim 1 wherein the selected polymeric material flowstream is flowing through the supercritical fluid reaction apparatus, and further comprising a plurality of electrically conductive particles dispersed throughout the selected polymeric material flowstream, with the plurality of electrically conductive particles being capable of being inductively heated.

7. The supercritical fluid reaction apparatus of claim 1 wherein the extruder comprises and elongated conveying zone that contains two or more elongated rotatable shafts having a plurality of flighted screws, and wherein the two or more elongated rotatable shafts are positioned lengthwise within an elongated conveying section housing.

* * * * *